Patented Feb. 11, 1930

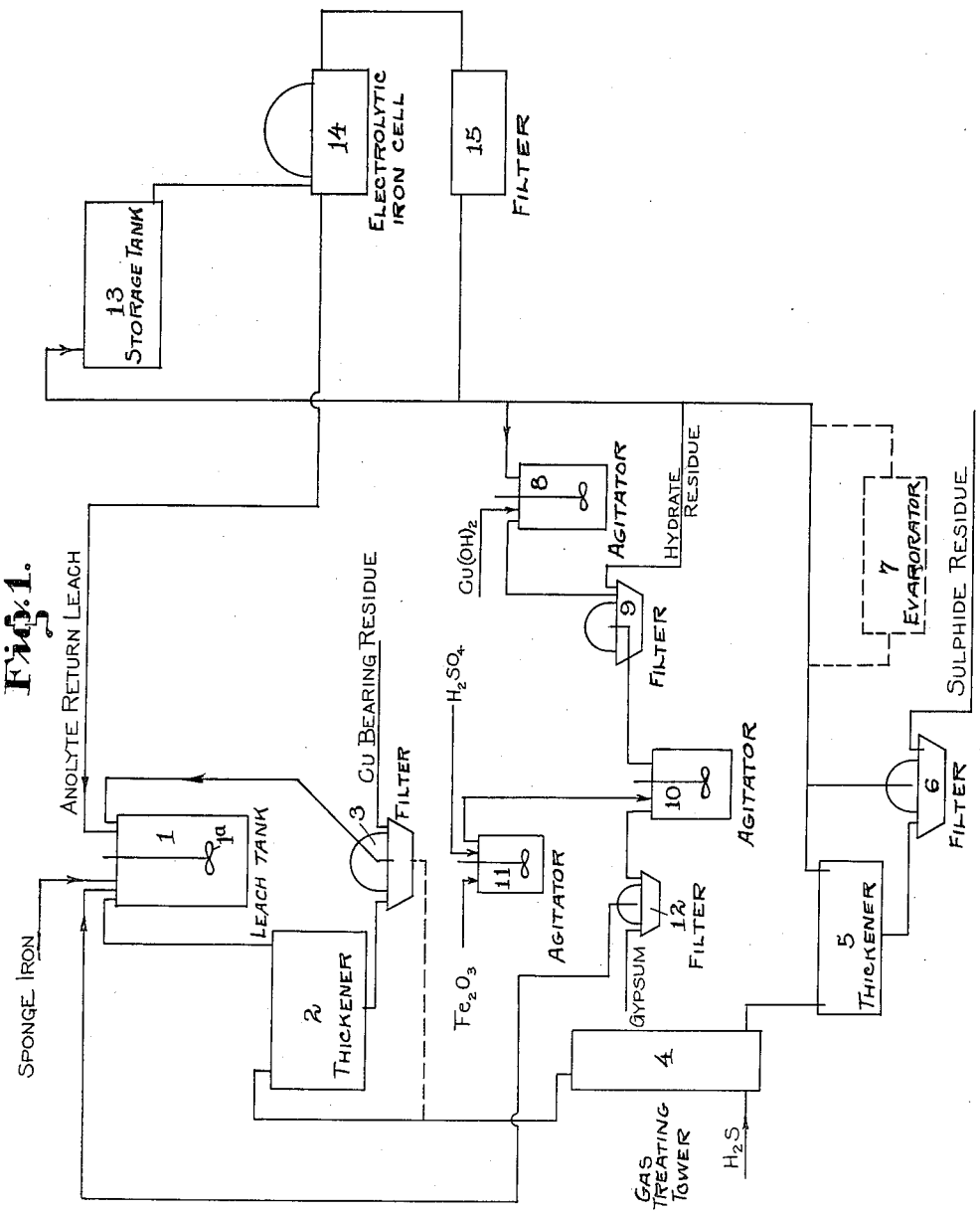

1,746,903

UNITED STATES PATENT OFFICE

ROBERT D. PIKE, OF PIEDMONT, CALIFORNIA

PROCESS FOR MAKING ELECTROLYTIC IRON

Application filed January 4, 1926. Serial No. 79,061.

In my application for United States Patent, Serial Number 58,012, I describe a process for making electrolytic iron from sulphide ores as a by-product of a process for recovering the more valuable metals of such ores. As pointed out therein, it is preferable to use chloride solutions in such a process; and when ferrous chloride is used as electrolyte in the diaphragm iron cell it is necessary to carry temperatures 70° C. or higher, to have satisfactory deposits.

My present invention covers a process for making pure electrolytic iron as a main product starting with sponge iron as a raw material and employing a ferric chloride leach and a ferrous chloride electrolyte for the diaphragm iron cell. In carrying out my process I preferably employ as raw material the sponge iron now being manufactured and known to metallurgists as "Chino" sponge iron. Chino iron is a special product made by the Chino Copper Company, by the so-called Thornhill and Anderson process. Its special property is that it is very finely divided and highly reactive in a chemical sense. I have discovered that when this iron is added to a leach liquor containing 8% to 10% total iron as chloride, about one-half as ferric and one-half as ferrous, a violent reaction occurs, whereby the iron of the sponge iron goes into solution as ferrous chloride, thereby completely reducing the ferric chloride of the leach liquor, and the temperature of the liquor is raised to the boiling point. This liquor is then treated to the necessary purification steps as rapidly as possible and transferred to the iron cell where its elevated temperature, principally derived from the sponge iron reaction, reduces or entirely eliminates the steam-heating required to maintain the temperature of the iron cell. This is of particular importance when using the cells described in my application for United States Patent, Serial Number 58,009, filed September 23, 1925, and in the application by myself and Messrs. Little and West, Serial Number 58,010, filed September 23, 1925, in which the rotation of the discs introduces a cooling effect which is best counteracted by introducing a hot electrolyte, i. e., 90° C. to 100° C., into the cell.

The electrolyte is purified as described in my above-mentioned applications, and a certain amount is "bled" at each cycle, depending upon the impurities in the sponge iron, but usually about 3% of the total amount in circulation. This amount is then treated with milk of lime to precipitate Mg, Al, and Fe and to make $CaCl_2$. This latter is then treated with ferrous or ferric sulphate, making the corresponding chlorides of iron and precipitating gypsum. The regenerated iron chlorides are returned to the circuit.

By means of my process I am enabled to start with a sponge iron containing 80% of metallic iron, more or less, and to directly produce a practically chemically pure iron.

A more detailed idea of a specific application of my process may be had by reference to the accompanying drawing, wherein the figure shows a flow sheet. There may be considerable departure from the details of this flow sheet within the meaning of my invention.

In the drawing I show a leach tank 1, preferably made of concrete, with propeller agitator 1ª, preferably covered with rubber. Anolyte leach returning from the electrolytic iron cells enters this tank in a continuous stream and is mixed with a stream of sponge iron introduced by a mechanical feeder, not shown. The sponge iron is introduced in slight excess so that the ferric iron will be completely reduced, and any copper or other relatively electro-negative metals, such as lead, will remain with the solids in tank 1. The overflow from tank 1, containing all undissolved solids, goes to thickener 2, the underflow of which goes to filter 3. The clear liquor from 3 may directly join the clear overflow from the thickener, but I have discovered that when copper is present, in even small amounts, in the solids, and such solids are filtered from the liquors, which are high in iron, a small amount of oxidation of the latter will always occur during filtering, forming traces of ferric chloride, and this ferric chloride will attack and redissolve some of the copper in the press cake even when the latter contains a surplus of metallic iron. On this account, the clear liquor from the press will contain traces of copper. From the standpoint of copper recovery, these amounts are small and could be neglected commercially, but they are sufficient to cause serious copper contamination of the electrolytic iron. For example, it is desirable that the latter contain not more than .02% Cu and preferably less, if the highest electromagnetic properties are to be realized. But I have found that in usual practice forty pounds of fresh electrolyte are supplied to the iron cell for each pound of iron produced, and that most of the copper in this electrolyte plates out with the iron. On this account the electrolyte should contain, as a maximum, .0005% of Cu. There is no difficulty in obtaining a copper-free overflow from the thickener 2, but the clear liquor from the filter 3 should be returned to the tank 1 for reprecipitation of its contained copper. The separation on a commercial scale of copper-free solutions of ferrous chloride from solids containing copper is a novel and important feature of my invention. The overflow from the thickener 2 goes to gas-treating tower 4, where it is treated with $H_2S$ gas for precipitation of the Zn and other metals or sulphides which may remain after the treatment in tank 1. In usual practice these other metals only occur in traces, if at all. The underflow from gas-treating tower 4 goes to thickener 5. The underflow from thickener 5 is filtered in filter 6, the clear liquor from which joins the overflow from thickener 5. Any traces of copper in the liquor entering the gas-treating tower 4 would presumably be precipitated by $H_2S$, but the same slight oxidation and resolution of sulphides in filter 6 would occur as in filter 3, so it is best to assure complete removal of copper by returning the clear liquor from filter 3 to tank 1. The purified liquors can now go through an evaporator 7, if necessary, but because of the great amount of heat generated in the reaction in tank 1, but little live steam is introduced in the cycle for heating, so that in practice evaporation is usually found to be unnecessary.

The "bled" portion of the electolyte goes to agitator 8, where sufficient milk of lime is added to precipitate all Fe, Mg, and Al present as hydrates, and the resulting $CaCl_2$ solution is filtered clear at 9. The $CaCl_2$ goes to an agitator 10, where it is mixed with ferrous or ferric sulphate. If this latter is used it may be made by treating some readily soluble form of iron oxide with sulphuric acid in 11, and then adding to agitator 10 with or without filtration. The overflow from agitator 10 is filtered at filter 12 and the clear liquor goes back to tank 1.

The purified electrolyte, after removal of the "bled" portion, goes to electrolyte storage tank 13, and thence to electrolytic iron cell 14. Circulating catholyte from this cell passes through filter 15, and thence back to storage tank 13. Live steam may be introduced at the latter point to make up for heat losses in the cycle.

Having thus described my invention, what I claim and desire to secure by Letters Patent is:

1. In a cyclic process for the production of substantially copper-free electrolytic iron from solutions containing copper, the steps for removal of the copper from the solutions which consist of treating the copper-bearing solutions with metallic iron, the removal of the main portion of the copper-free liquor from the precipitated copper by decantation, the filtering of the cement copper, and the return of the filtered liquor for reprecipitation of its copper content on iron.

2. In a cyclic process for the production of substantially copper-free electrolytic iron from solids containing copper, which consists of adding sponge iron to a leach containing iron chloride in a precipitating tank, passing the overflow solution from said tank to a thickener, returning the underflow from the thickener to the precipitating tank for reprecipitation of electro-negative metals, subjecting the overflow from the thickener to purification, and thereafter introducing the purified solution to an electrolytic cell.

ROBERT D. PIKE.